United States Patent
Schwalbach

(10) Patent No.: US 7,295,837 B2
(45) Date of Patent: Nov. 13, 2007

(54) TELECOMMUNICATION MODULE HAVING A SYSTEM-DATA PROCESSOR FOR PERFORMING AT LEAST ONE TELECOMMUNICATION ACTIVITY

(75) Inventor: Peter Schwalbach, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/511,536

(22) PCT Filed: Apr. 4, 2003

(86) PCT No.: PCT/DE03/01118

§ 371 (c)(1),
(2), (4) Date: Oct. 15, 2004

(87) PCT Pub. No.: WO03/088623

PCT Pub. Date: Oct. 23, 2003

(65) Prior Publication Data

US 2005/0130640 A1 Jun. 16, 2005

(30) Foreign Application Priority Data

Apr. 16, 2002 (DE) .............................. 102 16 853

(51) Int. Cl.
*H04M 1/00* (2006.01)
*G06F 15/16* (2006.01)
(52) U.S. Cl. .................... 455/418; 455/575.7; 709/217
(58) Field of Classification Search ................ 455/418, 455/557, 553.1, 466, 453, 575.7; 370/330; 717/136, 217; 375/222; 710/69, 10; 701/29; 379/93.07; 345/156; 364/708.1; 713/191; 709/217

See application file for complete search history.

(56) References Cited

U.S. PATENT DOCUMENTS

| | | | | | |
|---|---|---|---|---|---|
| 4,868,863 | A | * | 9/1989 | Hartley et al. | 379/93.07 |
| 5,307,297 | A | * | 4/1994 | Iguchi et al. | 345/169 |
| 5,353,334 | A | * | 10/1994 | O'Sullivan | 455/557 |
| 5,367,563 | A | | 11/1994 | Sainton | |
| 5,809,067 | A | * | 9/1998 | Funk et al. | 375/222 |
| 5,877,745 | A | * | 3/1999 | Beeteson et al. | 345/156 |
| 5,956,651 | A | * | 9/1999 | Willkie et al. | 455/553.1 |
| 6,044,422 | A | * | 3/2000 | Tran | 710/69 |
| 6,055,433 | A | * | 4/2000 | Yuan et al. | 455/453 |
| 6,075,863 | A | * | 6/2000 | Krishnan et al. | 713/191 |
| 6,473,609 | B1 | * | 10/2002 | Schwartz et al. | 455/406 |
| 6,535,911 | B1 | * | 3/2003 | Miller et al. | 709/217 |
| 6,574,678 | B1 | * | 6/2003 | Nykanen et al. | 710/10 |
| 6,636,789 | B2 | * | 10/2003 | Bird et al. | 701/29 |
| 6,671,495 | B1 | * | 12/2003 | Lappetelainen et al. | 455/67.11 |

(Continued)

FOREIGN PATENT DOCUMENTS

DE 19713965 10/1998

(Continued)

*Primary Examiner*—Joseph Feild
*Assistant Examiner*—Kiet Doan
(74) *Attorney, Agent, or Firm*—Bell, Boyd & Lloyd

(57) ABSTRACT

A telecommunication module is provided which includes a system-data processor for carrying out at least one telecommunication activity, a control data processor for automatically executing at least one control command sequence stored in the telecommunication module, the control command sequence being configured in such a way that it triggers the at least one telecommunication activity of the system processor during execution, and a first connector for connecting the telecommunication module to an external electronic device.

13 Claims, 1 Drawing Sheet

U.S. PATENT DOCUMENTS

| | | | |
|---|---|---|---|
| 6,681,259 B1* | 1/2004 | Lemilainen et al | 709/250 |
| 6,738,635 B1* | 5/2004 | Lewis et al. | 455/466 |
| 6,917,604 B2* | 7/2005 | Jyrkka | 370/337 |
| 2002/0012329 A1* | 1/2002 | Atkinson et al. | 370/330 |
| 2002/0144240 A1* | 10/2002 | Lueh et al. | 717/136 |

FOREIGN PATENT DOCUMENTS

| | | |
|---|---|---|
| EP | 0849682 | 6/1998 |
| EP | 0 869 691 | 10/1998 |
| WO | WO 99/61983 | 12/1999 |
| WO | WO 01/095097 | 12/2001 |

* cited by examiner

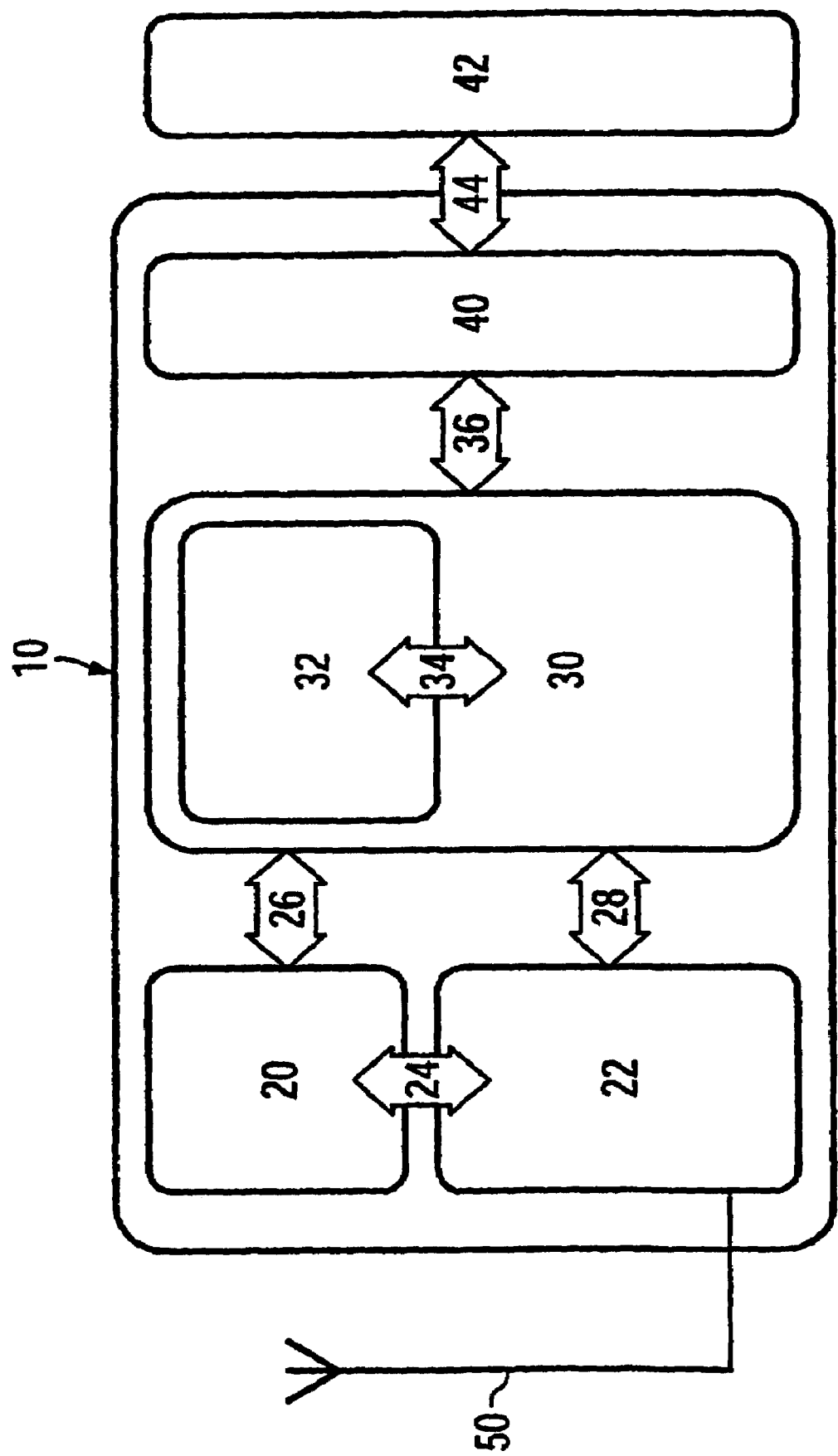

TELECOMMUNICATION MODULE HAVING A SYSTEM-DATA PROCESSOR FOR PERFORMING AT LEAST ONE TELECOMMUNICATION ACTIVITY

BACKGROUND OF THE INVENTION

The present invention relates to a telecommunication module having a system data processor for performing at least one telecommunication activity and a first connector for connecting the telecommunication module to an external electronic device.

Telecommunication modules of this kind are known from the prior art. In general, and also within the context of the present invention, telecommunication modules are defined as telecommunication terminals whose functionality is limited exclusively to setting up, carrying out and terminating telecommunication connections.

Therefore, telecommunication modules have, for example, no man-machine interface (MMI) of their own for direct input and output of data by and to a user. For operating a conventional telecommunication module of this kind, an external electronic device is necessary which is connected to the telecommunication module via a special interface. The telecommunication activities of the telecommunication module are controlled via the external electronic device which is generally termed a control unit or "controller." Data to be transmitted via the telecommunication connection set up is transmitted by the controller to the telecommunication module and data received by the module is, in turn, transmitted from it to the controller. There are telecommunication modules, for example, for interfacing with mobile telecommunication networks (e.g., GSM modules for connections to GSM networks) or to fixed telephone networks (such modules are generally referred to as modems).

External electronic devices may include personal computers (in particular, portable personal computers, such as laptops), as well as other devices such as measuring instruments (e.g., electricity meters, heating meters, weather stations) which can be controlled via the telecommunication module and/or transmit the measured values via the telecommunication module and the corresponding telecommunication network to a central facility.

The disadvantage of telecommunication modules of this kind is that their activities must be started by an external control device, the controller. To operate the telecommunication module, the controller therefore always must be switched on; i.e., even if only in a kind of "standby mode" in readiness for receiving an incoming call. This causes unnecessary power consumption which is undesirable, particularly in the case of battery-operated control equipment.

In order to be able to adapt particular telecommunication modules to specific user requirements, there is, for example, a programming environment and interface, the so-called "MUSE platform" (MUSE: Modular User Software Environment) for the Wavecom company's telecommunication modules (see e.g. http:\\www.wavecom.com\products\index.php). This allows a user to access the operating/system software originally implemented in the telecommunication module so that he/she can selectively modify it. Part of this "MUSE platform" is a software development environment, a so-called "OPEN AT" package which permits the implementation of new, user-created applications in the original module system software. Information about "OPEN AT" can be found, for example, in a Wavecom publication entitled "Take Command With OPEN AT" (Copyright Wavecom S.A. 10/2001) which is available on the Internet at "www.wavecom.com\products\docs\openATstec.pdf".

Using the "OPEN AT" software development environment, new applications can be designed by a user or operator of the telecommunication module, such as at a PC, integrated into the system software of the telecommunication module and then transmitted from the PC to the telecommunication module via a connection to the telecommunication module. This makes it possible to assign additional functionalities to the telecommunication module on a user-specific basis.

One disadvantage of this solution is that the new applications have to be translated into the special system language of the telecommunication module, which makes it costly to create the applications. Another disadvantage is that, by implementing the new applications in the system software of the module, the system software functionality may be changed and, in some cases, impaired (e.g., by modifying the jump instructions or memory addresses within the system software). More serious faults in this area even may, in some cases, touch on the operability of the entire telecommunication module. In some circumstances, such changes in the functionality of the system software may even jeopardize approval of the equipment by the relevant authorities and/or agencies.

Based on the prior art, an object of the present invention is, therefore, to provide a low-cost solution for integrating into a telecommunication module additional functionalities and/or applications which can be easily created, set up, modified and/or deleted.

SUMMARY OF THE INVENTION

This is achieved by a telecommunication module having a system data processor for performing at least one telecommunication activity, particularly for creating and/or setting up and/or implementing and/or monitoring and/or terminating a telecommunication connection, a control data processor for automatically executing at least one control instruction sequence stored in the telecommunication module, the control instruction sequence initializing at least one telecommunication activity of the system data processor, and a first connector for connecting the telecommunication module to an external electronic device; in particular, an external control unit or controller.

In a telecommunication module of this kind, additional applications and/or functionalities are implemented in the module in the form of control instruction sequences in the control data processor which is logically separated from the system data processor. As such, there is no direct intervention in the system software in the telecommunication module and the basic telecommunication functionality of the telecommunication module remains unchanged. Moreover, when formulating a control instruction sequence, the internal design of the system data processor does not need to accounted for in detail or even modified. It is sufficient to be familiar with the basic functionality of the system and to know how the functions implemented therein can be initialized, started or triggered by control instructions. This considerably simplifies the integration of new user-specific applications implemented as a control instruction sequence.

For processing the control instruction sequence, the individual control instructions are executed by the control data processor. For this purpose, the control data processor are implemented, for example, in such a way that one or more telecommunication activities, such as establishing a telecommunication connection, reading out certain connection parameters, transmitting information, receiving information or terminating the telecommunication connection, are initiated with a control command. As part of the execution of this control instruction, the corresponding signals are transmitted from the control data processor to the system data processor. This process is comparable, in principle, to the initiation of this telecommunication activity by an external control device. In this way, additional functionalities, which in the case of conventional modules would require the involvement of an external unit, can be assigned to the telecommunication module by the control instruction sequence. According to the present invention, telecommunication modules offer the possibility of enabling telecommunication activities to be performed under the control of both the control data processor and the external controller.

In this way, the telecommunication module can, for example, independently monitor a connection, regularly request information concerning the surrounding base stations of a mobile communication network to determine the location, or regularly check a mailbox. This saves, for example, system resources of the connected control unit which, for example, can be in a switched-off or battery-saving standby state or even engaged in another task. For example, a telecommunication module according to the present invention, which has been set up to operate in a conventional mobile communication network (e.g., in compliance with the GSM or CDMA standard), also can be used to monitor the connected telecommunication network for incoming calls via an application (control instruction sequence) additionally set up by a user. During this time, the associated controller, such as a PC or measuring instrument, can be switched off. If a telecommunication connection is required from outside, the module is able to detect this and switch on the external control device for further operation of the telecommunication connection.

If the telecommunication module is to perform only very specific functions implemented or stored in it as a control instruction sequence (or sequences), it is possible to operate the telecommunication module, at least temporarily, without a controller. This could be implemented, for example, for regular reading of meters and measuring instruments (e.g., heating meters, electricity meters, flow measuring equipment, weather stations), in which case the telecommunication module could then, for example, read out the corresponding measured values at regular intervals and transmit them wirelessly to a collecting point. The meters and measuring instruments do not need to possess any controller characteristics for this purpose.

An advantage of a telecommunication module according to the present invention is that, due to the separation of the control data processor from the system data processing means, the processing of a control instruction sequence (e.g. a subsequently implemented user-specific application) need not be performed inside the system data processor. As the system data processing means is controlled via the control data processor, for developing the control instruction sequence the emphasis has to be placed exclusively on the coherence of the control instruction sequence per se, the linking with the system data processor being assumed by the control data processor. As such, it is comparatively easy for new kinds of applications to be incorporated in the telecommunication module, modified or deleted.

A telecommunication module also may contain a number of control instruction sequences which either can belogically interlinked or performed independently of one another. The control data processor assumes and coordinates the processing of the individual control instruction sequences. This can be performed, for example, either serially (control instruction sequences are processed one after the other) or in parallel (in accordance with a multi-tasking method that is known, per se).

The instructions which can be executed by the control data processor can be represented in a way that is freely selectable by the telecommunication module manufacturer. However, the control instruction sequence advantageously includes at least one Java byte code instruction; in particular, a Java 2 MicroEdition byte code instruction or at least one BASIC instruction. These are essentially standardized instruction sets. An advantages of this is that a telecommunication module user does not first need to learn the module's specific control command language but can use the generally known standardized instruction sets. This simplifies the creation of applications and shortens the familiarization time for the application manufacturer or developer. The latter then only has to concern himself/herself with the features or characteristics of the telecommunication module and how specific actions are initiated.

Efficient execution of stored control instruction sequences and efficient production of the telecommunication module can be achieved if the control data processor includes a storage area for storing the one or more control instruction sequences and an execution part for executing the one or more control instruction sequences. As such, the application area of the telecommunication module is separated from the system data processor, and the actual application (i.e., the stored control instruction sequence and the associated execution part), are demarcated from the system data processor. The transition between application and system area is provided by a connection between the execution part and the system data processor. When designing a telecommunication module, for example, this separation has the advantage that one and the same system data processor can be used, irrespective of whether a module with or without the possibility of implementing external control instruction sequences is provided. This reduces the development cost/complexity of such modules.

In order to enable the one or more control instruction sequences stored in the telecommunication module to be formulated, at least partially, in one of the essentially standardized programming languages, the execution part for executing the command sequence may include an execution part for executing Java and/or BASIC program instructions. In this way, the above-mentioned advantages of using a standardized programming language can be used for creating the control instruction sequence.

In particular, the execution part for executing the user-specific application can be implemented as a Java virtual machine and/or BASIC interpreter. A Java virtual machine is an equipment-specific execution unit for programs in the so-called machine-independent Java byte code (generally designated by the suffix .class). A Java byte code of this kind is obtained if a program consisting of the actual Java programming instructions (generally designated by the suffix .java) is translated by a translation program (Java compiler). This is the normal procedure for writing Java programs and generally takes place in the development environment for the Java program, in most cases a PC (personal computer), a workstation or a mainframe. After translation, the machine-independent Java byte code is then transferred; e.g., to the telecommunication module.

The Java virtual machine also may be designed specifically for executing Java instructions associated with the above-mentioned Java 2 MicroEdition. This is a modification of the Java programming language specifically for small data processing devices such as microcomputers, palmtops, organizers or even mobile telecommunication terminals.

In addition, the execution part can be implemented as a BASIC interpreter; i.e., for processing instructions associated with the BASIC programming language. Furthermore, the execution part also may be a combination of Java virtual machine and BASIC interpreter. In this case, the execution part can recognize the instruction family to which an individual control instruction belongs and then process it accordingly. In this way, the advantages of the individual programming languages can be combined in a particularly favorable manner.

The execution part may include electronic circuits and possibly software components stored therein, these being of the type commonly used in data processing devices such as personal computers or minicomputers for comparable applications.

In order to be able to flexibly adapt the telecommunication module to the user's needs, the control instruction sequence can be advantageously created and/or modified and/or deleted by the external electronic device via the first connector. In this respect, the electronic device can be, for example, a personal computer (PC) on which the user-specific control instruction sequence can be developed and from which it then can be transmitted to the telecommunication module. If required, the PC also can read out again and modify or even delete the control instruction sequences/applications stored in the telecommunication module. In addition, the external electronic device can be a measuring instrument containing facilities for implementing, modifying or deleting applications in the telecommunication module. These can, in turn, be set up there, for example, by a computer which can be connected to the measuring instrument, and transmitted to the telecommunication module by operating elements on the measuring instrument or deleted or modified from there.

The above-described object likewise may be achieved by a method for controlling a telecommunication module wherein the telecommunication module includes a system data processor for performing at least one telecommunication activity, a control data processor, a first connector for connecting the telecommunication module to an external electronic device and a second connector for connecting the control data processing means to a system data processor, a control instruction sequence being additionally stored in the telecommunication module which is autonomously executed and implemented in such a way that, when executed, it initiates the one or more telecommunication activities of the system data processor.

The method described enables telecommunication activities of a telecommunication module, which are performed by the system data processor present in the telecommunication module, to be initiated by a control program (control instruction sequence; e.g., user-specific application) which remain stored in the telecommunication module.

The stored control instructions are interpreted by the control data processor which then initiates appropriate actions such as starting a telecommunication activity. This method employs the advantageous principal described above of implementing control data processing which remain separate from the system data processing of the telecommunication module and which execute the control instruction sequences stored in the telecommunication module. The fact that access to the system data processor takes place according to the present invention via the control data processor has the advantage that, when creating the control instruction sequence, the details of the system data processor do not need to be taken into account. This makes user-specific applications considerably easier to produce.

The controlling of conventional telecommunication modules via external control devices or controllers generally takes place via so-called AT control commands. With these AT control commands, the control unit or controller initiates the required telecommunication activities in the telecommunication module. In order to optimize the development time for the telecommunication modules according to the present invention and subsequent applications therefor, AT control commands likewise may be used, from the control data processor, for controlling the system data processing means. These are then transmitted by the control data processor to the system data processor via the second connector as part of executing a control instruction sequence/application. As the system data processor is generally already set up for executing the AT control commands (for control by the external controller), in some cases the configuration of the system data processor can be taken over from conventional modules, with only slight modifications, for developing telecommunication modules according to the present invention. This optimizes the development cost/complexity for modules according to the present invention. A combination of AT control commands and other control commands also may be used for controlling the system data processor. This enables the functionality of the module to be additionally extended.

An advantageous embodiment of the control data processor emerges if the one or more control instruction sequences contain at least one Java byte code instruction; in particular, a Java 2 MicroEdition byte code instruction or at least one BASIC instruction. As Java, Java 2 MicroEdition and BASIC are essentially standardized programming languages, these are particularly easy to learn or already known by the user. The use of such instructions saves user time and effort for programming the control instruction sequences and allows a degree of portability of newly developed applications between different modules.

In addition, the control data processor may be suitable for transferring data to the external electronic device via the first connector. In this way, for example, an application running in the telecommunication module can then transfer data, which the telecommunication module has received via a telecommunication connection, to the connected external electronic device. This might be, for example, text, image or control data received via the telecommunication network. In this context, control data can be, for example, instructions to be executed directly or even program sections, modifications or entire applications to be implemented in the electronic device. In this way, for example, a remote user can control the external electronic device directly via the telecommunication device and initiate specific activities thereat. Moreover, the data transmitted from the control data processor to the external electronic equipment also may be data which has been generated in the telecommunication module itself. This may be data relating to the existing telecommunication connection (e.g., transmission rates, transmit power, nearest base station, present call duration) but also, for example, control instructions; e.g., for switching the external device on or off.

The control instruction sequence stored in the telecommunication module can be run in various ways. For example, it can be initiated by the external electronic device. In addition, execution of the user-specific application can be initiated by establishing a connection from the telecommunication module to a power supply device. As such, for example, when the telecommunication module is plugged into the appropriate mounting facility of a computer or measuring instrument, an application such as searching for a connection to a communication network is executed automatically. It is also possible for a corresponding application to be initiated both when establishing a connection to a power supply device and by the external electronic device.

In addition, the control instruction sequence can be implemented in such a way that the instruction sequence, or part thereof, can, if necessary, be repeated at least once after a specified intervening time period has elapsed. This multiple execution of an application, or part thereof, is suitable, for example, for monitoring a telecommunication connection or for implementing a standby mode in which the telecommunication module, for example, regularly checks only whether a connection request from the telecommunication network to the module is present.

Another possible application for using telecommunication modules in wireless communication networks such as, for example, a GSM network, is for the independent regular checking of the connection data to the surrounding base stations by the module. This data then can, for example, continue to be transmitted to the external electronic device or be transmitted by SMS (Short Message Service) to a particular receiver in the telecommunication network for determining the location of the module. In the second case, the external electronic device would not be involved in the application in any way.

Additional features and advantages of the present invention are described in, and will be apparent from, the following Detailed Description of the Invention and the Figures.

BRIEF DESCRIPTION OF THE FIGURES

FIG. 1 shows a block diagram of the telecommunication module according to the present invention.

DETAILED DESCRIPTION OF THE INVENTION

FIG. 1 shows, by way of example, the basic configuration of a telecommunication module 10 according to the present invention. This includes, in the area of the system data processor 20, 22, 24, an area for storing and executing the actual module system software 22 which controls the operation of the basic telecommunication activities of the module 10. The system data processor 20, 22, 24 also includes an AT command interpreter 20 which translates AT control commands to the module's system language and transfers them between AT command interpreter 20 and system 22 via the connection 24. The telecommunication module 10 additionally includes an area for executing control programs (script interpreter) 30 which, in this context are also known as scripts. One or more control programs or scripts are stored in the memory 32 and transferred from there via the connection 34 to the control data processor referred to as a script interpreter. Depending on the instruction executed, the script interpreter 30 transmits signals and/or data via the connection 26 to the AT command interpreter or via the connection 28 directly to the system area of the module or via the connection 36 to the serial interface 40 of the module. The serial interface 40, such as a GPRS (General Purpose Input/Output), RS 232 or V.24 interface of the module, includes electronic circuits and connection parts for establishing a connection 44 to an external control unit 42, the functionality of the interface 40 also being modifiable by the telecommunication module 10.

The telecommunication module 10 illustrated is a telecommunication module 10 for a wireless mobile communication network to which the telecommunication module 10 is or can be connected via the antenna 50.

Via an external control unit 42, such as a PC, a new application for the telecommunication module can be transferred via the connection 44, the serial interface 40 and the connections 36 and 34 to the memory area 32 for the control instruction sequence. If the external electronic device then sends a start instruction to the script interpreter 30 to execute the control instruction sequence, or if the script interpreter 30 starts the control instruction sequence itself, the latter loads the relevant control instructions from the memory area 32 via the connection 34 and executes them accordingly. If the control instruction indicates, for example, that a particular telecommunication activity is to be initiated via an AT command, the script interpreter 30 transmits the corresponding AT command via the connection 26 to the AT command interpreter 20. The latter, in turn, forwards the data corresponding to the AT command via the connection 24 to the system area 22 of the telecommunication module. The module system then performs the corresponding communication activities via the antenna 50. Data received in this process can, in turn, for example, be fed back via the connection 28 from the system area to the script interpreter area. This can either process the corresponding information or forward it via the serial interface 40 to the external unit 42.

Using a telecommunication module 10 as shown in FIG. 1, it is possible, for example, to locate the telecommunication module 10 in a GSM mobile network without involving the external controller 42. For this purpose, a control instruction sequence stored in a memory area 32 is formulated in such a way that the telecommunication module 10 periodically solicits connection information such as channel number, adjacent cells or receive level of the current cell via the execution of specific AT commands. The information is transferred from the module system 22 to the script interpreter 30. Moreover, the control program is designed in such a way that it causes this data to be transmitted by SMS from the module system 22 via the antenna 50 to a remote receiver which uses this information to determine the location of the telecommunication module.

The outputting of strings to an external display unit, for example, also may be implemented in a similar way.

In addition, for example, an application which, at least among other things, forwards control instructions received via the telecommunication network for controlling the external unit 42 to the external unit 42 can be set up in the memory area 32 of the module 10.

The present invention describes a telecommunication module and a method for operating a telecommunication module which includes a control data processor for automatically executing at least one control instruction sequence stored in the telecommunication module, the one or more control instruction sequences being implemented in such a way that, when executed, they initiate at least one telecommunication activity of the system data processor of the telecommunication module. Through the possibility of integrating and running applications in the telecommunication module independently of the operating system of the telecommunication module, the possible uses of telecommunication modules are significantly increased. This additionally makes it possible, in particular, for simple monitoring activities of the controller normally connected to the telecommunication module to be transferred to the telecommunication module, thereby reducing the controller workload. In this way, the actual activity of the controller (e.g., measuring instrument or PC) may be speed up and the energy resources of the controller protected. For standard applications it is additionally possible to dispense with an external controller and to implement the control activities via control instruction sequences within the module.

Although the present invention has been described with reference to specific embodiments, those of skill in the art will recognize that changes may be made thereto without departing from the spirit and scope of the present invention as set forth in the hereafter appended claims.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A telecommunication module directly connected to a wireless mobile communication network, comprising:
    a system data processor for performing at least one telecommunication activity, the at least one telecommunication activity being exclusively limited to at least one of creating, setting up, implementing, monitoring and terminating a telecommunication connection with the wireless mobile communication;
    a control data processor that is logically separated from the system data processor, said control data processor automatically executing at least one control instruction sequence stored in the telecommunication module, the at least one control instruction sequence being implemented such that, upon execution, the at least one telecommunication activity is initiated; and
    a connector for further connecting the control data processor to an external electronic device; wherein
    the at least one control instruction sequence contains of at least one Java 2 MicroEdition byte code instruction and at least one BASIC instruction.

2. A telecommunication module as claimed in claim 1, wherein the control data processor includes a storage part for storing the at least one control instruction sequence and an execution part for executing the at least one control instruction sequence.

3. A telecommunication module as claimed in claim 2, wherein the execution part executes at least one of Java instructions and BASIC instructions.

4. A telecommunication module as claimed in claim 2, wherein the execution part includes at least one of a Java virtual machine and a BASIC interpreter.

5. A telecommunication module as claimed in claim 1, wherein the at least one control instruction sequence may be at least one of setup, modified and deleted by the external electronic device via the connector.

6. A method for controlling a telecommunication module directly connected to a wireless mobile communication network, the method comprising:
    providing that the telecommunication module include a system data processor for performing at least one telecommunication activity, the at least one telecommunication activity being exclusively limited to at least one of creating, setting up, implementing, monitoring and terminating a telecommunication connection with the wireless mobile communication network;
    providing that the telecommunication module include a control data processor that is logically separated from the system data processor;
    providing that the telecommunication module include a first connector for connecting the telecommunication module to an external electronic device;
    providing that the telecommunication module include a second connector for connecting the control data processor to the system data processor;
    storing at least one control instruction sequence in the telecommunication module; and
    automatically executing the at least one control instruction sequence stored in the telecommunication module such that the at least one control instruction sequence initiates the at least one telecommunication activity of the system data processor;
    wherein the at least one control instruction sequence contains of at least one Java 2 MicroEdition byte code instruction and at least one BASIC instruction.

7. A method for controlling a telecommunication module as claimed in claim 6, wherein for the automatic execution of the at least control instruction sequence, at least one AT control command is transmitted from the control data processor via the second connector to the system data processor.

8. A method for controlling a telecommunication module as claimed in claim 6, wherein the data is transferred from the control data processor via the first connector to the external electronic device.

9. A method for controlling a telecommunication module as claimed in claim 8, wherein the data contains instructions for controlling the external electronic device.

10. A method for controlling a telecommunication module as claimed in claim 6, wherein the at least one control instruction sequence stored in the telecommunication module may be at least one of created, modified and deleted by the external electronic device.

11. A method for controlling a telecommunication module as claimed in claim 6, wherein the automatic execution of the at least one control instruction sequence is initiated by at least one of the external electronic device and establishment of a connection from the telecommunication module to a power supply device.

12. A method for controlling a telecommunication module as claimed in claim 6, wherein the at least one control instruction sequence is implemented such that one particular control instruction sequence is repeated at least once.

13. A method for controlling a telecommunication module as claimed in claim 12, wherein the repetition of the one particular control instruction sequence occurs once a specified intervening time period has elapsed.

* * * * *